Figure 1:
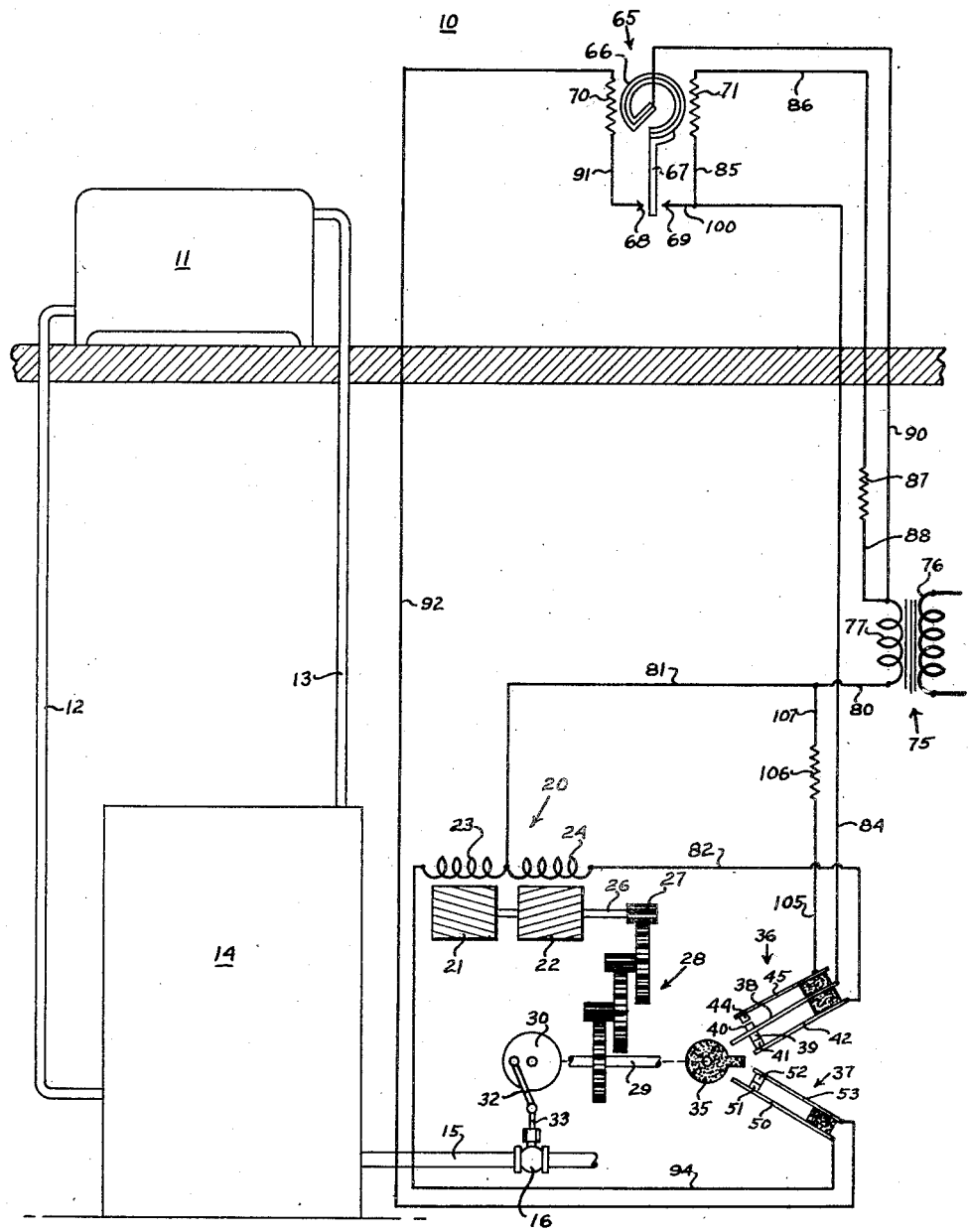

Inventor
Earl F. Diekhoff

June 30, 1942.  E. F. DIEKHOFF  2,287,788
CONTROL SYSTEM
Filed Sept. 26, 1938   2 Sheets-Sheet 2

Inventor
Earl F. Diekhoff
By
George H. Fisher
Attorney

Patented June 30, 1942

2,287,788

UNITED STATES PATENT OFFICE 2,287,788

CONTROL SYSTEM

Earl F. Diekhoff, Minneapolis, Minn., assignor to Minneapolis-Honeywell Regulator Company, Minneapolis, Minn., a corporation of Delaware Application September 26, 1938, Serial No. 231,651

17 Claims. (Cl. 236—68)

This invention relates to a control system and more particularly to a control system to be used in connection with a heating system although the principles of the invention are equally applicable to a cooling system.

In all heating systems there is a definite time lag between the time that a change in operation of the heating system takes place and the time that this change in operation actually affects the temperature of the space. This time lag is due to the length of time required for the heating medium to actually reach the space, to the heat capacity of the furnace and to the time required for the temperature of the space being heated to rise after the heating medium reaches the space, this latter condition being more particularly noticeable in a direct radiation system. This time lag will differ with various types of heating systems but such time lag is inherent in all heating systems and this is likewise true in the case of cooling systems.

Where the heating system is controlled directly in accordance with the temperature of the space the inherent time lag of the heating system causes undesirable fluctuations in the space temperature. Thus where the room thermostat calls for heat, for example, the temperature of the heating means will rise above that actually necessary to raise the temperature of the space to the desired value and after the thermostat is satisfied the residual heat in the heating means will continue to raise the temperature of the space beyond the desired value. It has been found impractical to construct thermostats without a definite operating differential so that a decrease in temperature in the space will not immediately affect the operation of the heating system until the temperature has dropped a certain amount below that at which the thermostat is satisfied as for example 2°. If the temperature of the heating means is not raised until the temperature of the space has fallen this 2° the temperature may continue to fall beyond this value before the change in operation of the heating plant will become apparent in the space by reason of the lag in the heating system. The temperature of the space will therefore be caused to undershoot and overshoot and will fluctuate an undesirable amount.

In accordance with my invention I have provided means to both anticipate the arrival of additional heat in the space and to anticipate a drop in the amount of heat supplied to the space in a manner to cause the temperature of the space to be maintained at substantially the desired value. My invention is particularly applicable with a control system of the so-called "floating" type. In one form of the invention, a room thermostat is movable between a pair of relatively fixed contacts and when the thermostat engages the cold contact, the supply of fuel to the furnace is gradually increased until the thermostat moves away from this contact. If the temperature in the space becomes sufficiently warm so that the thermostat engages the other fixed contact, the supply of fuel is gradually decreased until the thermostat moves away from this latter contact. Heating means are positioned adjacent the thermostat and operated in such a manner as to anticipate both a rise in temperature in the space and a drop in temperature in the space so as to maintain the temperature at a substantially uniform value. In a second form of the invention, a room thermostat that cooperates with a pair of fixed contacts located at one side thereof operates the same type of system.

It is therefore an object of my invention to provide a control system of the type outlined above for controlling the operation of a heating system in such a manner that an increase in temperature and also a decrease in temperature in the space being controlled is anticipated so as to maintain the temperature of the space at a substantially constant value.

Another object of the invention is in the provision of a control system of the floating type wherein a thermostat which cooperates with a pair of fixed contacts located on one side thereof is provided to control the system.

Figure 2:
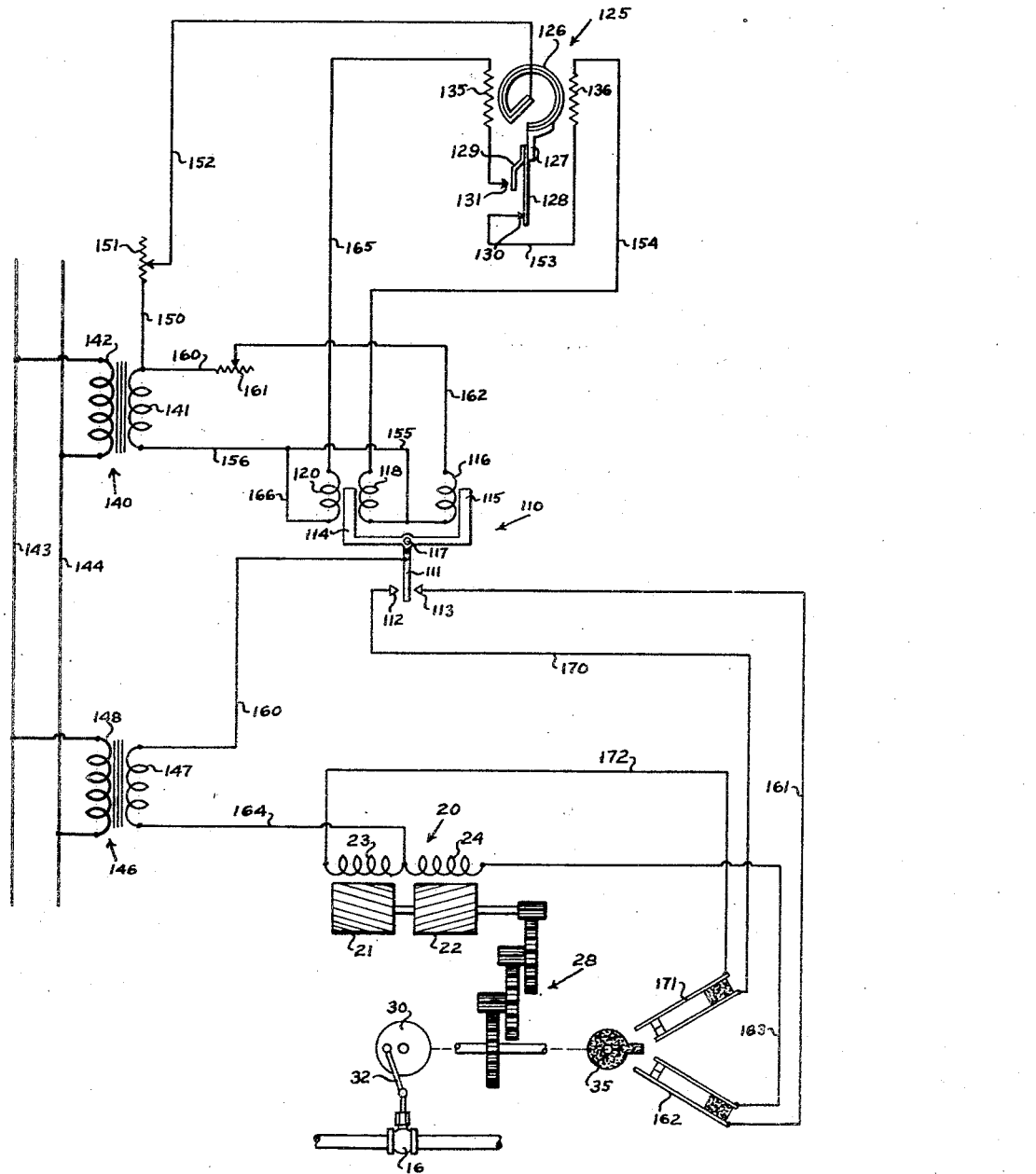

Other objects and advantages will become apparent upon a study of the specification, claims, and appended drawings wherein are illustrated two preferred forms of my invention, and wherein Figure 1 is a schematic view of one form of system embodying my invention, and Figure 2 is a schematic view of a second form of system embodying my invention.

Referring more particularly to Figure 1 of the drawings, the reference character 10 represents a space whose temperature is being controlled, there being a radiator 11 located in the space for increasing the temperature thereof, this radiator being connected by pipes 12 and 13 to a furnace 14. A pipe 15 is provided by means of which fuel is supplied to the furnace, the flow of fuel through this pipe being controlled by a valve 16.

The position of valve 16 and consequently the amount of fuel that is supplied to the furnace may be controlled by a motor generally represented by the reference character 20, this motor being of a versible type. The motor is illustrated as comprising a pair of armatures 21 and 22 cooperating with field coils 23 and 24, respectively. When the field coil 23 is energized armature 21 is rotated in one direction and when the field coil 24 is energized the armature 22 associated therewith is rotated in the opposite direction. Carried by the armature shaft 26 which is connected to the armatures 21 and 22 is a gear 27 which drives through the reduction gearing 28 a shaft 29 on which is mounted a crank member 30. This crank member is connected by means of the crank arm 32 to the stem 33 of the valve 16 and as the shaft 29 is moved in one direction or the other by the motor 20 the position of the crank 30 and the crank arm 32 is varied to vary the position of the valve member 16. Also carried by the shaft 29 is an insulating arm 35 which cooperates with switch members 36 and 37. The switch member 36 includes a flexible arm 38 having a portion extending into the path of the arm 35 so as to be moved thereby. The arm 38 carries contacts 39 and 40 and when the arm 38 is in its normal position the contact 39 engages a contact 41 mounted on the resilient arm 42. Upon rotation of crank 35 in a counter-clockwise direction the arm 38 will be moved upwardly until the contact 40 carried thereby engages the contact 44 on the arm 45. The resilience of the arm 42 will cause this arm to move with the arm 38 until contact 40 engages contact 44, and upon further movement of the arm 38 upwardly, the contact 39 is moved out of engagement with the contact 41. The switch member 37 includes a resilient arm 50 having a portion extending into the path of movement of the arm 35, this arm 50 carrying a contact 51 cooperating with a contact 52 carried by the stiff arm 53. When the arm 35 is rotated in a clockwise direction a sufficient amount the resilient arm 50 will be flexed downwardly so as to move the contact 51 out of engagement with the contact 52. These switches are designed to interrupt energization of the motor 20 upon movement of the valve 16 thereby to its extreme positions as will be explained hereinafter.

Located in the space 10 being heated is a thermostat 65 which may comprise a bimetallic element 66 carrying an arm 67 for cooperation with the fixed contact 68 and 69. The arrangement is such that upon a rise in temperature in the space the bimetal will cause movement of arm 67 towards the contact 69 and upon a drop in temperature in the space the arm 67 will be moved towards the contact 68. Closely associated with the bimetallic element 66 are a pair of heaters 70 and 71. These heaters are arranged to rapidly increase the temperature of the bimetallic element 66 upon energization thereof and if desired these heaters may be wound around the bimetallic element 66 for this purpose. These heaters are also designed to have a low residual heat capacity so that upon deenergization thereof they will cool rapidly.

For supplying power for operating the motor 20, a step down transformer 75 having a primary 76 connected to a suitable source of power (not shown) and a low tension secondary 77 is provided.

With the parts in the positions shown, the room thermostat 65 is satisfied, that is, the arm 67 is midway between the contacts 68 and 69 and is neither calling for more heat nor for less heat. The fuel supply valve 16 is in a fixed position wherein it is supplying substantially the proper amount of fuel to the furnace 14 to maintain the temperature of the space at the desirable value. The heater 70 adjacent the thermostat 65 is deenergized but the heater 71 is energized by means of the following circuit: from one side of the secondary 77 through conductors 80, 81, the field coil 24 of motor 20, conductor 82, switch arm 42, contacts 41, 39, arm 38, conductors 84, 85, the heater 71, conductor 86 a resistance element 87, and conductor 88 to the other side of the secondary 77. It will be noted that this circuit through the heater 71 includes the field coil 24 and the resistance 87 is provided in this circuit so that the resistance will be high enough to reduce the current flow through the field coil 24 to a value which will be insufficient to rotate the armature 22.

Assume now that the temperature within the space begins to fall due to an increased load on the heating system so that the arm 67 of thermostat 65 engages the contact 68. When this happens, current will flow through the field coil 23 as follows: from the secondary 77 through conductor 90, bimetal 66, and arm 67 of thermostat 65, contact 68, conductor 91, heater element 70, conductor 92, switch arm 53, contacts 52 and 51, switch arm 50, conductor 94, field coil 23, and conductors 81 and 80 to the other side of the transformer secondary 77. The energization of the field winding 23 causes rotation of the shaft 29 and crank 30 in a direction to gradually move the valve 16 towards its wide open position. The valve 16 will continue to move towards this wide open position as long as this field winding 23 is energized. Should the winding 23 be energized until the valve 16 is in its fully open position the arm 35 carried by the shaft 29 will open the switch 37 to deenergize the winding 23 when the valve reaches its wide open position. It will be noted that this energizing circuit for the field winding 23 includes the heater 70 and this heater will accordingly heat up causing the temperature of the bimetal 66 to increase more rapidly than the temperature of the space 10 so as to anticipate the arrival of heat therein. After a short time the bimetal 66 will be heated sufficiently to move the arm 67 out of engagement with the contact 68 whereupon the heater 70 and the field winding 23 are both deenergized. Deenergization of the winding 23 stops operation of motor 20 and the valve 16 thereupon remains in a further open position. The deenergization of heater 70 causes the temperature of the bimetal 66 to fall and if sufficient heat has not arrived in the space by this time the bimetal 66 may again move the arm 67 into engagement with the contact 68 whereupon the above cycle of operation is repeated and the valve 16 is moved to a further open position. The heater 70 by causing the bimetal 66 to heat more rapidly than the temperature of the space insures that the valve 16 will always stop operating before the temperature of the space has actually risen to the desired value, thus substantially reducing the possibilities of the space temperature rising above the desired value.

As noted above the heater 71 remains energized during all this time so that the bimetal 66 is slightly above the temperature of the space. Should the space temperature begin to rise above the desired value the arm 67 of the room thermostat will engage the fixed contact 69 whereupon the field winding 24 of the motor 20 will be energized through the following circuit: from the secondary 77 of transformer 75 through conductor 90, bimetal 66, arm 67, contact 69, conductors 100, 84, arm 38 of switch 36, contacts 39 and 41, arm 42, conductor 82, field winding 24, conductors 81 and 80 to the other side of secondary 77. It will be noted that this circuit shunts the circuit through the heater 71 and the resistance 87 so that the current through the heater 71 is reduced to a negligible value and this heater will begin to cool off. The energization of field winding 24 causes operation of motor 20 in a manner to move the valve 16 towards its closed position. Since the heater 71 which is normally energized is now shunted out by the circuit through the field winding 24 and begins to cool off the temperature of the bimetal 66 will drop more rapidly than the temperature of the space so that the arm 67 will move away from the contact 69 before the space temperature has actually dropped to the desired value, in this manner anticipating the drop in temperature before it actually occurs and thus compensating for the lag in the heating system. In other words, although the valve 16 is moved towards closed position the temperature of the space 10 will not begin to fall immediately because of the heat capacity of the radiator 11 and furnace 14 so that their temperatures will fall very slowly. As soon as the arm 67 moves away from the contact 69 the shunt circuit around the heater 71 is interrupted so that the heater is again energized and since the circuit through the field winding 24 now includes this heater and the resistance 87 there will be insufficient current flowing through the field coil 24 to cause rotation of the armature 22. If the temperature of the space is still higher than that desired the arm 67 will move back into engagement with the contact 69 whereupon the valve 16 will be moved still further towards closed position, the heater 71 will cool off and the arm 67 will again move out of engagement with the contact 69.

Should the valve be moved to its entirely closed position the arm 35 moves the arm 38 of switch 36 into engagement with the contact 44 and out of engagement with the contact 41. When the contact 39 is moved out of engagement with the contact 41 the circuit through the armature 24 is interrupted and rotation of the motor 20 therefore stops since the valve has been moved to its entirely closed position. The movement of contact 40 into engagement with contact 44 establishes a new circuit through the heater 71 as follows: from the secondary 77 through conductor 88, resistance 87, conductor 86, heater 71, conductors 85, 84, switch arm 38 of switch 36, contacts 40, 44, arm 45, conductor 105, resistance 106, and conductors 107 and 80 to the other side of the secondary 77. This circuit is of course shunted out as long as the arm 67 of thermostat 65 is in engagement with the contact 69 but as soon as the arm moves away from the contact the heater will again be energized by means of this new circuit, the original circuit for this heater being interrupted at the switch 36. This new circuit includes the resistance 106 which has the same impedance value as the field winding 24 so that the heat given off by the heater 71 will be substantially the same as when the circuit through the heater included the field winding 24 when the thermostat blade 67 moves away from contact 69. It is necessary of course that heater 71 be energized at this time even when the contacts 39 and 41 of limit switch 36 are opened since otherwise the thermostat would engage contact 68 at a higher ambient temperature than normally, which would cause hunting of the system. Since at this time the circuit through field winding 24 is open, it is necessary to insert a resistance in the circuit to the heater 71 having the same impedance value as the winding 24 so that the calibration of the thermostat will not be upset, and accordingly the resistance 106 is provided.

It will now be apparent that when the temperature of the space is below the desired value and thermostat arm 67 engages contact 68, the valve 16 will move towards open position and the heater 70 will be simultaneously energized so as to open the circuit at the thermostat and stop the operation of the valve before the space temperature has actually increased to the desired value so as to anticipate the arrival of heat in the space. This operation will occur intermittently until the space temperature has risen to the desired value whereupon the arm 67 of the thermostat remains midway between the contacts 68 and 69. During all this time the heater 71 is energized but if the temperature of the space should rise above the desired value thermostat arm 67 will engage the contact 69 energizing the motor 20 in a manner to move the valve 16 towards closed position and simultaneously shunting out the heater 71 so that the temperature of the bimetal will drop more rapidly than the temperature of the space so as to anticipate the fall in temperature of the space so that the valve 16 will not be closed too far. This valve will be intermittently closed in this manner until the temperature of the space has dropped to the desired value wherein the arm 67 will again be maintained between the contacts 68 and 69 and the heater 71, when in this position, will be energized. The valve 16 is accordingly moved to a position wherein the proper amount of fuel is supplied to the furnace to maintain the temperature of the space at substantially the desired value and this is done while preventing overshooting or undershooting of the space temperature to any appreciable extent by means of the novel arrangement of the heaters 70 and 71.

Referring now to the form of invention shown in Figure 2, the motor 20 for operating the valve 16 is controlled by a relay generally designated by the reference character 110. This relay includes an arm 111 cooperating with the fixed contacts 112 and 113. The relay also includes an armature composed of members 114 and 115 and cooperating with the armature member 115 is a relay coil 116. When energized this coil tends to move the arm 111 about the pivot 117 into engagement with the fixed contact 113. A second relay coil 118 cooperates with the armature member 114 and when coils 116 and 118 are simultaneously energized they exert equal and opposite forces on the two armature members and tend to maintain the arm 111 midway between the contacts 112 and 113. A third relay coil 120 also cooperates with the armature member 114 and when both the coils 118 and 120 are energized the armature member 114 is urged upwardly, these two coils more than counteracting the effect of the relay coil 116 whereupon the arm 111 is moved into engagement with the fixed contact 112.

The operation of relay 110 is controlled by a room thermostat 125 which differs from the room thermostat of Figure 1 in that the fixed contacts are both disposed on the same side of the movable arm of the thermostat. This thermostat is shown to comprise a bimetallic element 126 on the movable arm 127 of which is carried the contact members 128 and 129. Fixed contacts 130 and 131 cooperate with the contact members 128 and 129 and the arrangement is such that upon an initial drop in temperature contact member 128 engages the contact 130, and upon a further drop in temperature affecting the thermostat the contact member 129 engages the fixed contact 131. As the temperature affecting the thermostat rises, the contact members move away from the fixed contacts in the reverse order. Disposed closely adjacent the bimetal 126 are the heaters 135 and 136. These heaters may, if desired, be wound around the bimetal. Heater 136 is arranged to be energized when the contact member 128 is in engagement with the fixed contact 130 and the heater 135 is arranged to be energized when the contact member 129 engages contact 131.

Power is supplied to the relay 116 by means of the step-down transformer 140 composed of the low tension secondary 141 and a high tension primary 142 connected to the line wires 143 and 144 which are, in turn, connected to a suitable source of power, not shown. For supplying power to the motor 20 a step-down transformer 146 may be provided, this transformer including the low tension secondary 147 and the high tension primary 148 connected to the line wires 143 and 144.

*Operation of Figure 2*

When the temperature in the space is at the desired value, the contact member 128 of the thermostat 125 will be in engagement with the fixed contact 130 whereupon current will flow through the heater 136 and the relay coil 118 as follows: from the secondary 141 of transformer 140 through conductor 150, variable resistance 151, conductor 152, bimetal 126, contact member 128, fixed contact 130, conductor 153, electrical heater 136, conductor 154, relay coil 118, and conductors 155 and 156 to the other side of the secondary 141. Accordingly, some heat will be supplied to the thermostat by the heater 136 whereby the temperature of the bimetal will be somewhat above the space temperature. It will be noted that the relay coil 118 is at this time energized, but relay coil 116 is always energized through the following circuit: from the transformer secondary 141 through conductor 160, variable resistance 161, conductor 162, relay coil 116, and conductors 155 and 156 to the other side of the secondary 141. The relay coils 116 and 118 are so designed and the current flow through the two members are adjusted by means of the variable resistance 161 so that when these two coils are energized and the relay coil 120 is not energized, they will attract the armature members 114 and 115 equally so that the arm 111 will be in a position midway of the contacts 112 and 113. At this time there is no flow of current through the motor 20 so that the valve 16 is in a fixed position and supplying a fixed amount of fuel to the furnace. Assume now that the temperature within the space rises higher than is desirable. In this case, the bimetal 126 will move member 128 out of engagement with the contact 130, thus interrupting the aforedescribed circuit through the relay coil 118 and the heater 136. Since the relay coil 116 is always energized and since at this time neither coil 118 nor 120 is energized, arm 111 will be moved into engagement with the contact 113, thus completing a circuit through the field winding 24 of the motor 20 as follows: from the secondary 147 of the transformer 146, through conductor 160, arm 111, contact 113, conductor 161, limit switch 162, conductor 163, field winding 24, and conductor 164 to the other side of secondary 147. Energization of winding 24 will cause the motor 20 to gradually move the valve 16 towards closed position thus decreasing the supply of fuel to the furnace and in this manner reducing the temperature in the space. Since the heater 136 is no longer energized, the temperature of the thermostat will fall somewhat more rapidly than the temperature of the space and in this way the thermostat will anticipate the drop in temperature in the space by reason of the reduction in the supply of fuel to the furnace, and when the thermostat has cooled sufficiently so that the circuit through arm 128 and contact 130 is reestablished, the circuit through the motor 20 will be interrupted by the relay 110 and the heater 136 will again be energized.

If now the temperature in the space should fall sufficiently so that the member 129 of the thermostat 125 is moved into engagement with the contact 131, a circuit will be established through the relay coil 120 and the heater 135 as follows: from the transformer secondary 141 through conductor 150, variable resistance 151, conductor 152, bimetal 126, contact member 129, contact 131, the heater 135, conductor 165, relay coil 120, and conductors 166 and 156 to the other side of the secondary 141. It will now be apparent that all the relay coils 116, 118, and 120 are energized. Since the capacity of the coil 118 is just sufficient to counteract the effect of the relay coil 116, the energization of the coil 120 will provide sufficient extra attraction for the armature member 114 so that the arm 111 will be moved into engagement with the contact 112. A circuit is now established through the field winding 23 of the motor 20 as follows: from the transformer secondary 147 through conductor 160, arm 111, contact 112, conductor 170, limit switch 171, conductor 172, field winding 23, and conductor 164 to the other side of transformer secondary 147. Energization of the winding 23 causes the motor 20 to move the valve 16 towards open position whereupon the supply of fuel to the furnace is increased so that additional heat is supplied to the space to raise the temperature thereof. Since the heater 135 is now energized and the heater 136 is still energized, additional heat is supplied to the bimetal 126 to further increase the temperature thereof above the space temperature and in this way to anticipate the arrival of additional heat in the space. Accordingly, the contact member 129 will be moved out of engagement with the contact 131 prior to the time that the space temperature has actually risen to the desired value so as to compensate for the lag in the heating system, and when this happens the arm 111 of the relay 110 will again move into a position between the contacts 112 and 113 so that the circuit through the motor 20 will be interrupted and the movement of valve 16 will cease.

It will now be understood that the form of invention illustrated in Figure 2 operates in substantially the same manner as the form of invention shown in Figure 1 except that a different type of thermostat is employed to control the operation of motor 20, the fixed contacts of this thermostat being placed on one side of the movable arm thereof and the thermostat controlling the operation of motor 20 through the relay 110. It will be understood that the limit switches 162 and 171 function in the same manner as the limit switches of Figure 1 to interrupt the circuit through the motor whenever the motor moves the valve to either of its extreme positions. The provision of the adjustable resistance 151 permits adjustment of the heating capacities of the heaters 135 and 136 and if the current through these resistances is varied by means of this adjustable resistance, the current through the relay coils 118 and 120 will likewise vary and accordingly the adjustable resistance 161 is employed to likewise adjust the current flow through the relay coil 116 so that the relay coils 116 and 118 will exercise equal effects on the armature members 114 and 115. It should be understood, of course, that the heating effects of the heaters in Figure 1 may likewise be adjusted by the provision of suitable adjustment resistances as in Figure 2 so that the heating effects of these resistances may be adjusted to suit the needs of the particular heating system.

Having described the preferred forms of my invention, many modifications may become apparent to those skilled in the art. For example, the motor 20 instead of operating a fuel valve, may operate check and draft dampers which regulate the temperature maintained in the furnace or any other suitable mechanism for controlling the temperature of a space. The furnace may be hot water, steam, or a hot air furnace whereupon the radiator 11 would be replaced by a warm air duct. In such a furnace there is a smaller heating lag and the resistances 70 and 71 would therefore have a smaller heat capacity. Any known type of heating system may be similarly controlled. The room thermostats may also be of any conventional construction wherein the temperature responsive element has additional heat supplied thereto by the heaters positioned adjacent thereto. It should therefore be understood that my invention is limited only by the scope of the appended claims.

I claim as my invention:

1. In a temperature controlling system, a temperature responsive element, a circuit controlling means carried by said element and movable into first, second and third circuit controlling positions in response to variations in the ambient temperature for controlling temperature changing apparatus for a space whose temperature is to be controlled, auxiliary meating means having fixed high and low capacities located closely adjacent said temperature responsive element, means responsive to movement of said circuit controlling means to the first circuit controlling position to cause operation of said auxiliary heating means at the fixed high capacity thereof, means responsive to movement of said circuit controlling means to the second circuit controlling position to cause operation of said auxiliary heating means at the fixed low capacity thereof, and means responsive to movement of said circuit controlling means to the third circuit controlling position to interrupt operation of said auxiliary heating means.

2. In a temperature controlling system, a temperature responsive element, a circuit controlling means carried by said element and movable into first, second and third circuit controlling positions in response to variations in the ambient temperature, a pair of auxiliary electrical heating means located closely adjacent said temperature responsive element for raising the temperature of the temperature responsive element above the ambient temperature, means responsive to movement of said circuit controlling means to the first circuit controlling position for causing energization of both of said auxiliary heating means, means responsive to movement of said circuit controlling means to the second circuit controlling position for causing energization of one only of said auxiliary heating means, and means responsive to movement of said circuit controlling means to third circuit controlling position for interrupting operation of both of said auxiliary heating means.

3. In a system of the class described, temperature responsive means including a control arm movable in response to variations in the ambient temperature, spaced contacts arranged to be engaged by said arm in response to movement thereof in opposite directions, heating means in close proximity to said temperature responsive means for raising the temperature of the temperature responsive means above the ambient temperature, means for causing operation of said heating means at high capacity when said control arm is in engagement with one contact, means for causing operation of said heating means at low capacity when said control arm is in engagement with neither contact, and means for interrupting operation of said heating means when said control arm is in engagement with the other contact.

4. In a system of the class described, temperature responsive means for controlling the operation of heating apparatus, said temperature responsive means including a control arm movable in response to variations in the ambient temperature, spaced contacts arranged to be engaged by said arm in response to movement thereof in opposite directions, a pair of auxiliary heaters in close proximity with said temperature responsive means, means for energizing both of said auxiliary heaters when said control arm is in engagement with one of said contacts, means for energizing one only of said auxiliary heaters when said control arm is in engagement with neither of said contacts, and means for interrupting the operation of both of said auxiliary heaters when said control arm is in engagement with the other of said contacts.

5. In a heating system, heating means for a space, control means for varying the heating effect of said heating means, temperature responsive means in said space, local heating means having fixed high and low capacities adjacent said temperature responsive means, means responsive to movement of said temperature responsive means to a first position in response to a drop in temperature in the space to cause operation of said control means to continuously increase the heating effect of said heating means and to cause operation of said local heating means at the fixed high capacity thereof, means responsive to movement of said temperature responsive means to a second position in response to a rise in temperature at the temperature responsive means for interrupting operation of said control means and for causing operation of the local heating means at the fixed low capacity thereof, and means responsive to movement of said temperature responsive means to a third position in response to a further rise in temperature at the temperature responsive means to cause operation of the control means to continuously decrease the heating effect of said heating means and to interrupt the operation of said local heating means.

6. In a heating system, heating means for a space, control means for varying the heating effect of said heating means, temperature responsive means in said space, a pair of electrical heaters adjacent said temperature responsive means, said temperature responsive means being movable between first and second positions in response to variations in temperature at said means, means responsive to movement of said temperature responsive means to the first position for energizing both of said electrical heaters and for operating the control means to continuously increase the heating effect of the heating means, means responsive to movement of the temperature responsive means to a position intermediate said first and second positions to cause energization of one only of said electrical heaters and to interrupt operation of said control means, and means responsive to movement of the temperature responsive means to the second position for causing operation of neither of said electrical heaters and for operating said control means to continuously decrease the heating effect of said heating means.

7. In a heating system, means for heating a space, temperature responsive means in said space, spaced contacts cooperating with said temperature responsive means, one of said contacts being arranged to be contacted by said temperature responsive means when the temperature affecting the temperature responsive means drops to a predetermined value, the other contact being arranged to be contacted by said temperature responsive means when the temperature affecting the temperature responsive means rises to a predetermined value, means responsive to engagement of said one contact and the temperature responsive means for increasing the heating effect of said heating means, means responsive to engagement of said other contact and the temperature responsive means for decreasing the heating effect of said heating means, a pair of electric heaters closely associated with said temperature responsive means, and circuit connections for causing energization of both heaters when the temperature responsive means is in engagement with said one contact, for causing energization of one only of said heaters when said temperature responsive means is in engagement with neither contact, and for interrupting operation of both heaters when the temperature responsive means is in engagement with said other contact.

8. In a heating system, means for heating a space, temperature responsive means in said space, spaced contacts cooperating with said temperature responsive means, one of said contacts being arranged to be contacted by said temperature responsive means when the temperature affecting the temperature responsive means drops to a predetermined value, the other contact being arranged to be contacted by said temperature responsive means when the temperature affecting the temperature responsive means rises to a predetermined value, means responsive to engagement of said one contact and the temperature responsive means for increasing the heating effect of said heating means, means responsive to engagement of said other contact and the temperature responsive means for decreasing the heating effect of said heating means, auxiliary heating means closely associated with said temperature responsive means, means responsive to engagement of said temperature responsive means with said one contact for causing operation of said auxiliary heating means at high capacity, means responsive to movement of said temperature responsive means out of engagement with both of said contacts to cause operation of said auxiliary heating means at low capacity, and means responsive to engagement of said temperature responsive means with said other contact to interrupt operation of said auxiliary heating means.

9. In a system of the class described, temperature responsive means including a control element movable between first and second positions in response to temperature changes affecting the temperature responsive means, a pair of electrical heating elements adjacent said temperature responsive means, means for connecting one of said heating elements to a source of power regardless of the position of said control element, means connecting said other heating element to said source of power only when said control element is in the first position, and means responsive to movement of the control element to the second position for shunting out said one of the heating elements.

10. In a heating system, heating means for a space, control means for varying the heating effect of said heating means, temperature responsive means in said space, means responsive to movement of said temperature responsive means to a first position to operate the control means in a manner to increase the heating effect of the heating means, means responsive to movement of said temperature responsive means to a second position spaced from the first position to operate the control means in a manner to decrease the heating effect of the heating means, auxiliary heating means having fixed high and low capacities adjacent the temperature responsive means for raising the temperature of the temperature responsive means above the temperature of the space, means responsive to movement of the temperature responsive means to the first position for causing operation of said auxiliary heating means at the fixed high capacity thereof, means responsive to movement of the temperature responsive means to a position between the first and second positions for causing operation of the auxiliary heating means at the fixed low capacity thereof, and means responsive to movement of the temperature responsive means to the second position for interrupting operation of the auxiliary heating means.

11. In a system of the class described, temperature responsive means including a control arm movable in response to variations in the ambient temperature, a pair of contacts located at one side of said control arm and arranged to be sequentially engaged thereby in response to an increase in temperature affecting the temperature responsive means, heating means in close proximity to said temperature responsive means for raising the temperature of the temperature responsive means above the ambient temperature, means for causing operation of the heating means at high capacity when said control arm is in engagement with both contacts, means for causing operation of said heating means at low capacity when said control arm is in engagement with only one contact, said heating means being deenergized when said control arm is in engagement with neither contact.

12. In a heating system, means for heating a space, temperature responsive means in said space, a pair of contacts cooperating with said temperature responsive means and arranged to be sequentially engaged thereby in response to a rise in temperature in the space, means responsive to engagement of both of said contacts by said temperature responsive means for increasing the heating effect of the heating means, means responsive to movement of said temperature responsive means out of engagement with both contacts for decreasing the heating effect of the heating means, a pair of electric heaters closely associated with said temperature responsive means, and circuit connections for causing energization of both of said heaters when both of said contacts are engaged by the temperature responsive means, for causing energization of only one heater when only one of the contacts is engaged by the temperature responsive means, and for interrupting energization of both heaters when neither contacts is engaged by the temperature responsive means.

13. In a system of the class described, condition changing means, means for controlling the condition changing effect of the condition changing means, said controlling means including a reversible motor means, means responsive to a condition being controlled, said condition responsive means including a control arm movable sequentially into and out of engagement with a pair of fixed contacts located on one side of said control arm in response to variations in the condition being controlled, means responsive to engagement of said arm with both contacts for energizing a circuit through said motor means to cause rotation thereof in one direction, means responsive to movement of said arm out of engagement with both of said contacts for energizing a second circuit through said motor means to cause rotation thereof in the other direction, and means responsive to engagement of said arm with one only of said contacts for deenergizing said motor means regardless of the position thereof.

14. In a system of the class described, temperature changing means, means for controlling the temperature changing effect of the temperature changing means, said means including a reversible motor means, means responsive to the temperature of a space being heated by the temperature changing means, said temperature responsive means including a movable control arm cooperating with a pair of sequentially engageable contacts positioned on one side thereof, means responsive to engagement of said arm with both contacts for energizing a circuit through said motor means to cause rotation thereof in a direction to decrease the heating effect of the heating means, means responsive to movement of said arm out of engagement with both of said contacts for energizing a second circuit through said motor means to cause rotation thereof in the other direction, and means responsive to engagement of said arm with one only of said contacts for deenergizing said motor means regardless of the position thereof.

15. In a system of the class described, temperature changing means, means for controlling the temperature changing effect of the temperature changing means, said means including a reversible motor means, means responsive to the temperature of a space being heated by the temperature changing means, said temperature responsive means including a movable control arm cooperating with a pair of sequentially engageable contacts positioned on one side thereof, means responsive to engagement of said arm with both contacts for energizing a circuit through said motor means to cause rotation thereof in a direction to decrease the heating effect of the heating means, means responsive to movement of said arm out of engagement with both of said contacts for energizing a second circuit through said motor means to cause rotation thereof in the other direction, means responsive to engagement of said arm with one only of said contacts for deenergizing said motor means regardless of the positions thereof, and heating means located adjacent the temperature responsive means for raising the temperature thereof above the ambient temperature, said heating means including a first heater in series with one of said contacts and a second heater in series with the other of said contacts so that the heat imparted to the temperature responsive means by said heating means will depend upon how many of said contacts are engaged by said control arm.

16. In a system of the kind described, a control element movable between a pair of spaced contacts, a first coil when energized biasing said element toward one contact, a second coil when energized exactly counteracting the biasing effect of said first coil, a third coil which when energized with the second coil biasing said element into engagement with the other contact even though the first coil is energized, means constantly energizing the first coil, and means for selectively controlling the energization of said other coils.

17. In a system of the kind described, a control element movable between a pair of spaced contacts, a first coil when energized biasing said element toward one contact, a second coil when energized counteracting the biasing effect of said first coil, a third coil which when energized with the second coil biasing said element into engagement with the other contact even though the first coil is energized, means constantly energizing the first coil, means controlling the energization of said other coils, said last named means including a condition responsive device having an arm movable in response to variations in a condition being controlled towards and away from a pair of sequentially engaged contacts located on one side thereof, means responsive to engagement of said arm and one of said contacts for energizing said second coil whereby the control element is in engagement with neither contact, and means responsive to engagement of said arm with both contacts for energizing the second and third coils whereby the control element is moved into engagement with said other contact.

EARL F. DIEKHOFF.